United States Patent [19]
Holub et al.

[11] 3,887,582
[45] June 3, 1975

[54] BIS-IMIDE COMPOSITIONS

[75] Inventors: Fred F. Holub, Schenectady, N.Y.; Carl M. Emerick, New Brighton, Pa.

[73] Assignee: General Electric Company, Schenectady, N.Y.

[22] Filed: Sept. 20, 1973

[21] Appl. No.: 398,929

Related U.S. Application Data

[60] Continuation-in-part of Ser. No. 149,805, June 3, 1971, abandoned, which is a division of Ser. No. 819,430, April 25, 1969, Pat. No. 3,651,012.

[52] U.S. Cl. ....... 260/326.26; 117/128.4; 260/32.4; 260/88.3 R; 260/326 N
[51] Int. Cl............................................. C07d 27/18
[58] Field of Search................................ 260/326.26

[56] References Cited
UNITED STATES PATENTS
2,547,496    4/1971    Rowland........................ 260/326.26

Primary Examiner—Joseph A. Narcavage
Attorney, Agent, or Firm—Joseph T. Cohen; Jerome C. Squillaro

[57] ABSTRACT

The invention covers novel imide compositions, which can be polymerized alone or coreacted with copolymerizable monomers and various polymers and resins having utility in insulation and protective applications, as well as being useful in numerous molding applications.

4 Claims, No Drawings

BIS-IMIDE COMPOSITIONS

This application is a continuation-in-part of an earlier application Ser. No. 149,805, filed June 3, 1971 now abandoned, which in turn is a division of our earlier filed application Ser. No. 819,430, filed Apr. 25, 1969, now U.S. Pat. No. 3,651,012, all assigned to the same assignee as the present invention.

This invention is concerned with novel bis-imide compositions and polymers and copolymers therefrom. More particularly, the invention is concerned with a bisimide composition having the formula

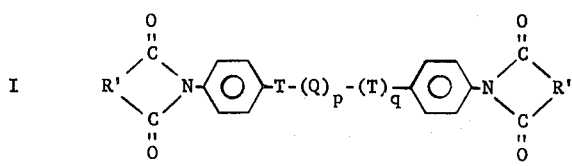

where R' is a member selected from the class consisting of the

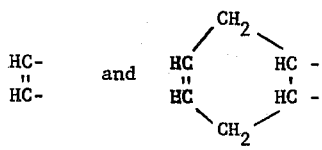

groupings, T is a member of the class consisting of

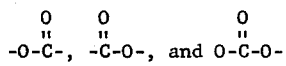

radicals, and Q is a divalent organic radical selected from the class consisting of

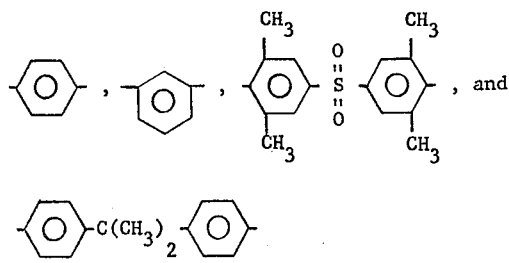

radicals, and $p$ and $q$ are 0 or 1.

The imides of formula I can be prepared in different manners depending on the desired composition coming within the scope of formula I, and also depending, in a number of instances, on whether $p$ and $q$ are 0 or 1, and whether Q is a divalent monophenylene radical or Q comprises a divalent diphenylene radical. One group of compounds coming within the scope of formula I can be prepared by effecting reaction between about 2 mols of a compound corresponding to the general formula

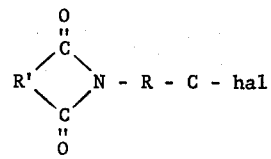

and about 1 mol of a dihydroxy compound corresponding to the formula

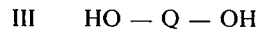

where R is a phenylene radical, and R' and Q have the meanings above. Alternatively, the reaction may be carried out between 2 mols of a compound having the general formula

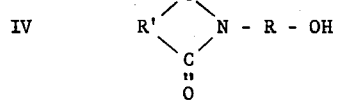

and 1 mol of a composition corresponding to the general formula

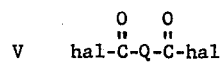

where R, R', and Q have the meanings above, and "hal" is halogen, e.g., chlorine, bromine, etc.

As a still further alternative, one can form compositions coming within the scope of formula I by effecting reaction between a mol of a compound of formula IV with one mol of a compound of formula II.

As will be apparent to those skilled in the art, the preparation of carbonate derivatives coming within the scope of formula I can be carried out in numerous ways, but one method which has been particularly effective involves the reaction of, for instance, a composition corresponding to formula IV with phosgene or with diphenyl carbonate. More complex carbonate derivatives coming within the scope of formula I can be obtained by effecting reaction between the general composition of formula III and a composition of formula IV wherein mixtures of these two compositions are subjected to phosgenation by treating again with either phosgene or diphenyl carbonate.

In making the isocyanato compositions occurring within the scope of formula I, one can effect reaction between a compound corresponding to the general formula IV and a diisocyanato compound of the formula

where Q has the meaning given above. Generally, 2 mols of the hydroxy compound of formula IV per mol of the compound of formula VI is adequate for obtaining the desired composition.

It will be apparent that in discussing the above methods for preparing the various compositions embraced by formula I, R, R', and Q all have the meanings given above.

Among the divalent radicals which Q may represent are, for instance, biphenylene methylene of the formula

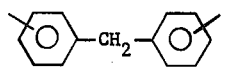

biphenylene oxide, biphenylene sulfone, biphenylene sulfide, keto biphenylene of the formula

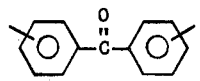

biphenylene isopropylidene of the formula

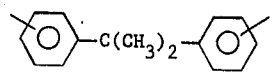 etc.

Obviously, the arylene radicals may be attached to nitrogen through the ortho-, meta- or para- positions of the arylene nucleus.

Typical of the compositions coming under the generic formula II which can be used in the practice of the present invention may be mentioned: p-maleimidobenzoyl chloride, p-tetrahydrophthalimidobenzoyl chloride, endomethylenetetrahydrophthalimido benzoyl chloride, hexachloroendomethylenetetrahydrophthalimido benzoyl chloride, tetrachlorotetrahydrophthalimido benzoyl chloride, etc.

Among the dihydroxy compounds corresponding to the formula III may be mentioned, for instance, hydroquinone, 4,4'-dihydroxydiphenyl methane, 3,3'-dihydroxydiphenyl methane, 4,4'-dihydroxydiphenyl propane-2, 4,4'-dihydroxydiphenyl oxide, 4,4'-dihydroxydiphenyl sulfone, etc. It will of course be apparent to those skilled in the art that in place of the arylene derivatives of formula III, aliphatic derivatives may also be employed including, for instance, ethylene glycol, diethylene glycol, propylene glycol; 2,6,2',6'-tetramethyldihydroxydiphenyl methane, etc.

Included among the compositions coming within the scope of general formula IV which can be employed in the practice of the present invention are, for instance, p-tetrahydrophthalimidophenol, p-maleimidophenol, N-(p-hydroxyphenyl) endomethylenetetrahydrophthalimide, N-hydroxyphenylhexachloroendomethylenetetrahydrophthalimide, etc. Numerous compositions coming within the scope of the general formula V which can be employed include, for instance, phthaloyl chloride, terephthaloyl chloride, isophthaloyl chloride, dichlorophthaloyl chloride, 4,4'-bis-chloroformyldiphenyl methane, etc.

In all instances where one of the reactants has an imido radical in its molecular structure, it will be apparent that intended within such compositions are those which have the maleimido and tetrahydrophthalimido radicals present. In each instance, a person skilled in the art will recognize the starting ingredients which are required to make those compositions which come within the scope of formula I.

Typical of isocyanato compounds which can be employed under formula VI are, for example, 1,4-phenylene diisocyanate, tolylene diisocyanate, biphenylene diisocyanate, hexamethylene diisocyanate, etc. The positions of the isocyanato groups on the arylene nucleus can be varied widely and may be ortho, meta, or para to each other, or vicinal, symmetrical or asymmetrical with regard to other substituents, e.g., alkyl groups, on the arylene nucleus.

As pointed out above, the reactants, whereby the compositions of formula I can be prepared, can be used in various molar ratios depending on the type of ultimate composition desired. In some respects the molar ratio of the reactants will depend on the meanings assigned to T and Q, and the values assigned to p and q. For instance, if one should desire to make compositions corresponding to the formula

VII

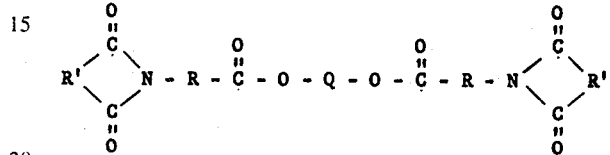

obviously one would react about 2 mols of the composition corresponding to formula II with about 1 mol of a composition corresponding to formula III; variations in the molar concentrations may be, for example, from about 1.5 to 3 mols of compositions of the general formula II per mol of the dihydroxy compound of formula III. However, if one were desirous of making compositions of the formula VIII 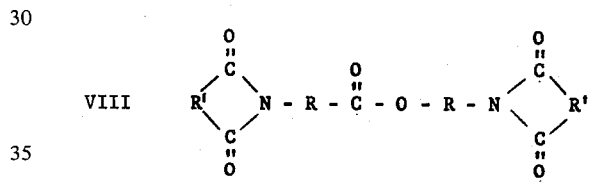

one of course would react an ingredient corresponding to the general formula II with an ingredient corresponding to general formula IV; in this respect, the molar ratios would be approximately 1 mol of each of the reactants.

Persons skilled in the art will have no difficulty in determining the molar concentrations employed since generally it will be self-evident from an examination of the desired ultimate composition. The examples appended hereto furnish additional disclosures and teachings for making the various compositions coming within the scope of the general formula I.

Advantageously, the reaction between the ingredients is carried out in the presence of an inert solvent, for instance, dimethyl formamide, N-methyl-2-pyrrolidone, tetrachloroethane, chlorinated biphenyl and chlorinated diphenyl oxide, etc. The amount of solvent used should be sufficient to efficiently dissolve the reactants and should have a high enough boiling point so that conveniently the reaction can be carried out at atmospheric pressure at the elevated temperatures which are usually employed for the purpose.

In general, the mixture of ingredients is heated at a temperature ranging from about 50° C. to about 200° C. for a time varying from about 2 minutes to about 4 hours or more until such time as completion of the reaction is achieved. For convenience, the reaction may be carried out under an inert atmosphere, for instance, under a nitrogen atmosphere and additionally, provision is made for removal of the hydrogen halide which evolves in many of the reactions as a result of the intereaction of the two ingredients. Generally, under such conditions, completion of the reaction can be determined by cessation of the evolution of hydrogen halide. Thereafter, the desired reaction product can be obtained by pouring the solution of the reaction mixture into a non-solvent, such as methanol for the reaction product, or in some instances into water, and isolating the reaction product by filtration or by separation if a two-phase system is obtained.

In order that those skilled in the art may better understand how the present invention may be practiced, the following examples are given by way of illustration and not by way of limitation. All parts are by weight unless otherwise indicated. In the following examples, the reactions were carried out in a reaction vessel equipped with a stirrer, condenser, and nitrogen inlet through which a nitrogen blanket was established in the reaction chamber. Throughout the reaction, the mixture was stirred constantly while at the same time removing all evolving hydrogen halide through the condenser if this was a by-product of the reaction.

EXAMPLE 1

In this example, 4.56 parts 4,4'-dihydroxydiphenylmethane and 9.4 parts p-maleimidobenzoylchloride in a molar ratio of 1 mol of the former to 2 mols of the latter, and 30 parts tetrachloroethane were mixed together and stirred and heated at 150° to 155° C. for about 1½ hours until HCl ceased to evolve. The reaction mixture was then cooled and the product was precipitated by addition to methanol. The precipitated solid product which resulted was filtered and dried at 90° C/20 mm (Hg) for about 18 hours to yield a product having the formula

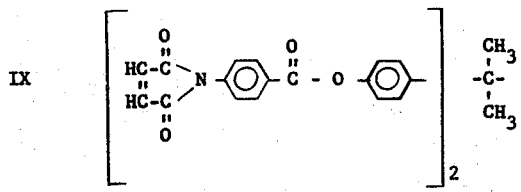

Evidence of this product was established by the analyses which were as follows:

|     | Theoretical | Found |
| --- | --- | --- |
| %C  | 71.0 | 68.5 |
| %H  | 4.16 | 4.10 |
| %N  | 4.16 | 4.15 |

EXAMPLE 2

In this example, 9.4 parts p-maleimidobenzoylchloride, 9.72 parts p-tetrahydrophthalimidophenol in a molar ratio of 1 mol of the former to 1 mol of the latter and 48 parts tetrachloroethane were mixed together and the mixture was stirred and heated at 155° C. for about 2 hours essentially until all HCl was evolved. The mixture was then cooled to form a precipitate which was removed by filtration. The filtrate was poured into methanol which in turn precipitated more solid product which was then added to the filtered solid. The combined mixture was dried at 90° C./20 mm (Hg) for about 18 hours to give a solid product which, although not having a melting point (it was soluble in methylene chloride), when heated in air at about 200° to 250° C., yielded a thermoset product. This compound was found to have the formula

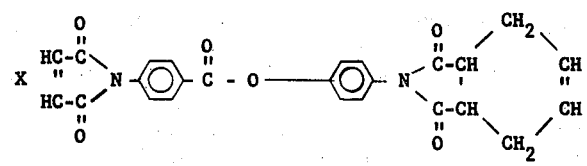

as evidenced by the following analyses:

|     | Theoretical | Found |
| --- | --- | --- |
| %C  | 68.2 | 67.0 |
| %H  | 3.74 | 4.1 |
| %N  | 6.36 | 6.05 |

EXAMPLE 3

In this example, 5.12 parts 2,6-xylenol sulfone of the formula

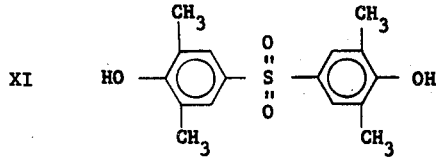

and 9.4 grams p-maleimidobenzoyl chloride in the molar ratio of 1 mol of the former to 2 mols of the latter were mixed with 30 parts tetrachloroethane and the mixture was stirred and heated at 155° C. for 6 hours until essentially all HCl was evolved. The mixture was then cooled and the product precipitated in methanol as in the preceding examples, and the precipitate was filtered and dried at 80° C./20 mm (Hg) for about 18 hours. This composition was found to have the formula

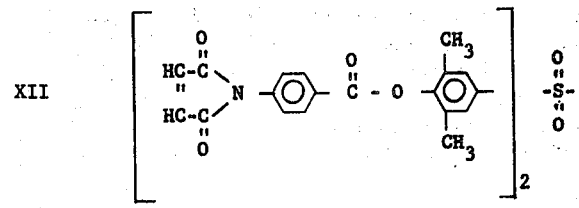

as evidenced by the analyses which were as follows:

|     | Theoretical | Found |
| --- | --- | --- |
| %C  | 64.7 | 64.7 |

|  | Theoretical | Found |
|---|---|---|
| %H | 3.98 | 4.0 |
| %N | 3.98 | 3.84 |

EXAMPLE 4

48 grams (0.2 mol) p-tetrahydrophthalimidophenol, dissolved in 150 ml methylene chloride and an amount of pyridine sufficient to effect solution of the aforesaid phenol, were charged to a reaction vessel equipped with a stirrer, condenser, and thermometer. Phosgene was admitted into the solution while the latter was stirred; the phosgenation was carried out until the temperature rose to a maximum and then proceeded to drop. This took about 2 hours. The product was precipitated with methanol as in the preceding examples, washed with additional methanol and dried in vacuum at 105° C./20 mm. This yielded a composition having the formula

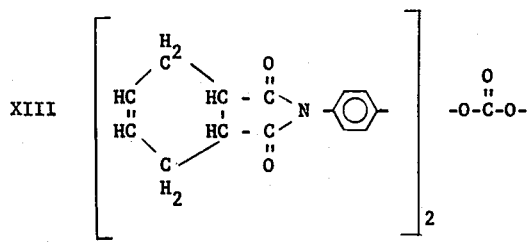

melting at 234°–8° C. whose identity was established as evidenced by the following analyses:

|  | Theoretical | Found |
|---|---|---|
| %C | 68.0 | 68.5 |
| %H | 4.68 | 4.79 |
| %N | 5.48 | 5.61 |

Upon heating a sample of the aforesaid bis-imide in air at 250° C. for 10 minutes, the material became strong and rubbery, and insoluble in methylene chloride.

EXAMPLE 5

About 4.4 parts hydroquinone, 18.8 parts p-maleimidobenzoyl chloride, and about 60 parts tetrachloroethane were stirred and heated at the reflux temperature of the mass under nitrogen for about 18 hours, then cooled, the precipitated solid product removed by filtration and dried in vacuum at 80° C. This yielded a product melting at around 200° C. which was identified as having the formula

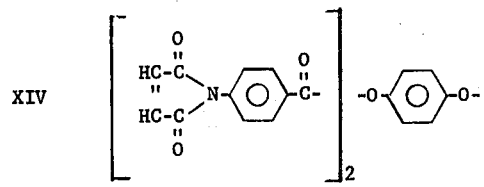

as evidenced by analysis of the composition which was as follows:

|  | Theoretical | Found |
|---|---|---|
| %N | 5.5 | 5.0 |

A film was cast from a warm solution of 20 percent solids solution in N-methyl pyrrolidone containing 5 weight percent dicumyl peroxide, based on the weight of the bismaleimide. The film was heated at 150° C. for 1 hour and at 200° C. for one-half hour to yield a tough film which had a cut-through temperature of about 355° C.

The compositions of formula I can be heated at elevated temperatures to effect polymerization thereof to the cured thermoset, that is, infusible and insoluble (in methylene chloride) state. Generally, the incorporation of a source of free radicals such as an organic peroxide or an azonitrile will accelerate the polymerization so that shorter periods of time and lower temperatures can be employed. Among the sources of free radicals which may be employed are, for instance, organic peroxides, for example, benzoyl peroxide, tertiary butyl perbenzoate, dicumyl peroxide, di-(tertiary butyl)-diperphthalate, etc.; azonitriles, for example, azobisisobutyronitrile, etc. Another source of free radicals may be obtained by the use of high energy radiation, such as high energy electrons which can also be employed to effect conversion of the maleimides of formula I to the infusible and insoluble state without application of heat.

When heat is employed, generally temperatures of the order of from about 100° to 250° C. for times ranging from about 1 minute to 2 hours or more can be used, depending on the particular compound being polymerized, the presence or absence of a source of free radicals, the concentration of such free radical source, etc. When a curing agent is employed for the purpose, it is generally used in an amount equal to about 0.01 to about 5% or more, by weight, based on the weight of the composition undergoing polymerization.

As pointed out previously, the compositions of the present invention can be converted by heat and organic peroxides to the thermoset, infusible and insoluble state. The following example illustrates this.

EXAMPLE 6

Twenty parts of the maleimide compound of Example 3, formula XII, was dissolved in 80 parts N-methyl-2-pyrrolidone together with 0.4 part dicumyl peroxide. The solution was then cast on a substrate and the film cured at 120° C. for 1 hour, 200° C. for 1 hour, and 250° C. for 1 hour. There was thus obtained a cured thermoset film which was self-supporting and had a cut-through temperature of 370° C.

In addition to the homopolymerization of the imido compositions of the present invention, they may also be polymerized with other copolymerizable olefinic monomers containing at least one $CH_2=C<$ groupings (e.g., from 1 to 3 such groupings) wherein the copolymerizable monomer comprises a positive amount ranging, by weight, in an amount equal to 0.01 to 3 parts of the copolymerizable monomer per part of the imido composition. Included among such vinyl monomers may be mentioned, for instance, vinyl chloride; isobutylene, butadiene, isoprene, vinyl acetate, acrylonitrile, styrene; acrylic esters, such as methyl-, ethyl-, butyl-, etc., esters of acrylic and methacrylic acids, etc.; diallyl phthalate, divinyl benzene, triallyl citrate, triallyl cyanurate, etc. When copolymerizing the imido composition of formula I with the olefinic monomers, the copolymerization may take place in the presence or absence of a source of free radicals.

In addition to the copolymerization referred to above, it is also possible to coreact the imido compositions of formula I, with other polymers and resins in amounts ranging from 1 to 50% or more, by weight, of the resin or polymer, based on the total weight of all the ingredients undergoing polymerization. Included among such polymers may be mentioned polyolefins (e.g., polyethylene, polypropylene, etc.) polystyrene, polyphenylene oxides such as shown in U.S. Pat. No. 3,306,875, epoxy resins, polycarbonate resins such as shown in U.S. Pat. No. 3,028,365, silicone resins, phenol-aldehyde resins, polyimide resins such as shown in U.S. Pat. No. 3,179,633-634, polyarylene polyethers such as shown in U.S. Pat. No. 3,332,909, etc., many of which are well known in the art.

The compositions of the present invention have application in a wide variety of physical shapes and form, including the use as films, molding compound, etc. The unusual heat stability and resistance to deformation at elevated temperature, while at the same time retaining their properties at elevated temperatures in the cured state, makes these compositions especially unique. When used as films or when made into molded products, these polymers, including the laminated products prepared therefrom not only possess excellent physical properties at room temperature but they retain their strength and excellent response to workloading at elevated temperatures for long periods of time. The fact that they have high decomposition points, well above 400° C., and in some instances above 500° C., indicates a wide range of commercial utility for these products. These polymers in particular resist fusion when exposed to temperatures of 400° to 500° C. for extended periods of times while still retaining an exceptionally high proportion of their room temperature physical properties. The ability to make fusible or soluble precursors of the finally cured products makes them especially suitable in the preparation of shaped articles such as films, molded products, etc., whereby using conventional techniques, the mixture of copolymerized ingredients can be converted in situ to the finally cured, and infusible, and insoluble state.

Films formed from the polymeric compositions of this invention may be used in applications where films have been used previously and in addition film therefrom can be used in applications where films in the past have not been especially suitable. They serve effectively in an extensive variety of wrapping, packaging and bundling applications. Thus, the compositions of the present invention can be used in automobile and aviation applications for decorative and protective purposes, and as high temperature electrical insulation for motor slot liners, in transformers, as dielectric capacitors, and as coil and cable wrappings (form wound coil insulation for motors).

Alternatively, solutions of the curable compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluorolethylene, etc. The use of the curable compositions of the present invention as overcoating on other types of insulation is not precluded.

Applications which recommend these resins include their use as binders for asbestos fibers, carbon fibers, and other fibrous materials in making brakelinings. In addition, grinding wheels and other abrasive articles can be made from such resins by incorporating abrasive grains such as alundum, carborundum, diamond dust and particles, etc., and shaping or molding the mixture under heat and pressure to obtain the desired configuration and shape for grinding and abrasive purposes.

What we claim as new and desire to secure by Letters Patent of the United States is:

1. A composition of matter corresponding to the general formula

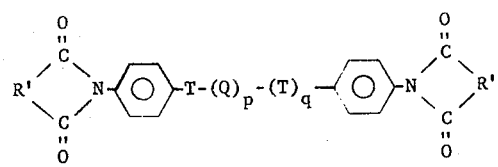

where R' is the

grouping, T is a member of the class consisting of

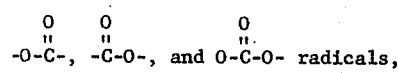

radicals, and Q is a divalent organic radical selected from the class consisting of

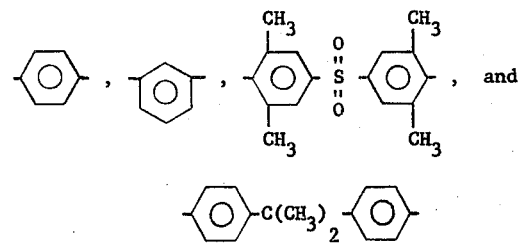

radicals, and $p$ and $q$ are 0 or 1.

2. A composition of matter corresponding to the formula

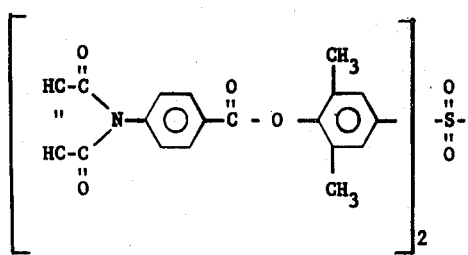
3. A composition of matter corresponding to the formula
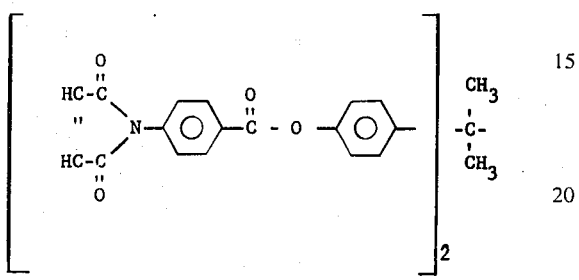
4. A composition of matter corresponding to the formula
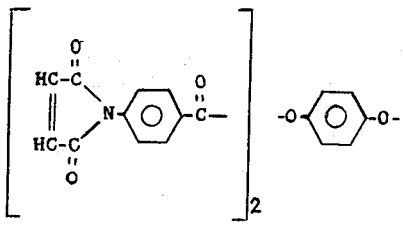
* * * * *